March 4, 1952  J. K. McNEILL  2,587,873
APPARATUS FOR CULTIVATION BY FLAME
Filed Dec. 26, 1947  3 Sheets-Sheet 1

Inventor.
James K. McNeill
Paul O. Pippel
Atty.

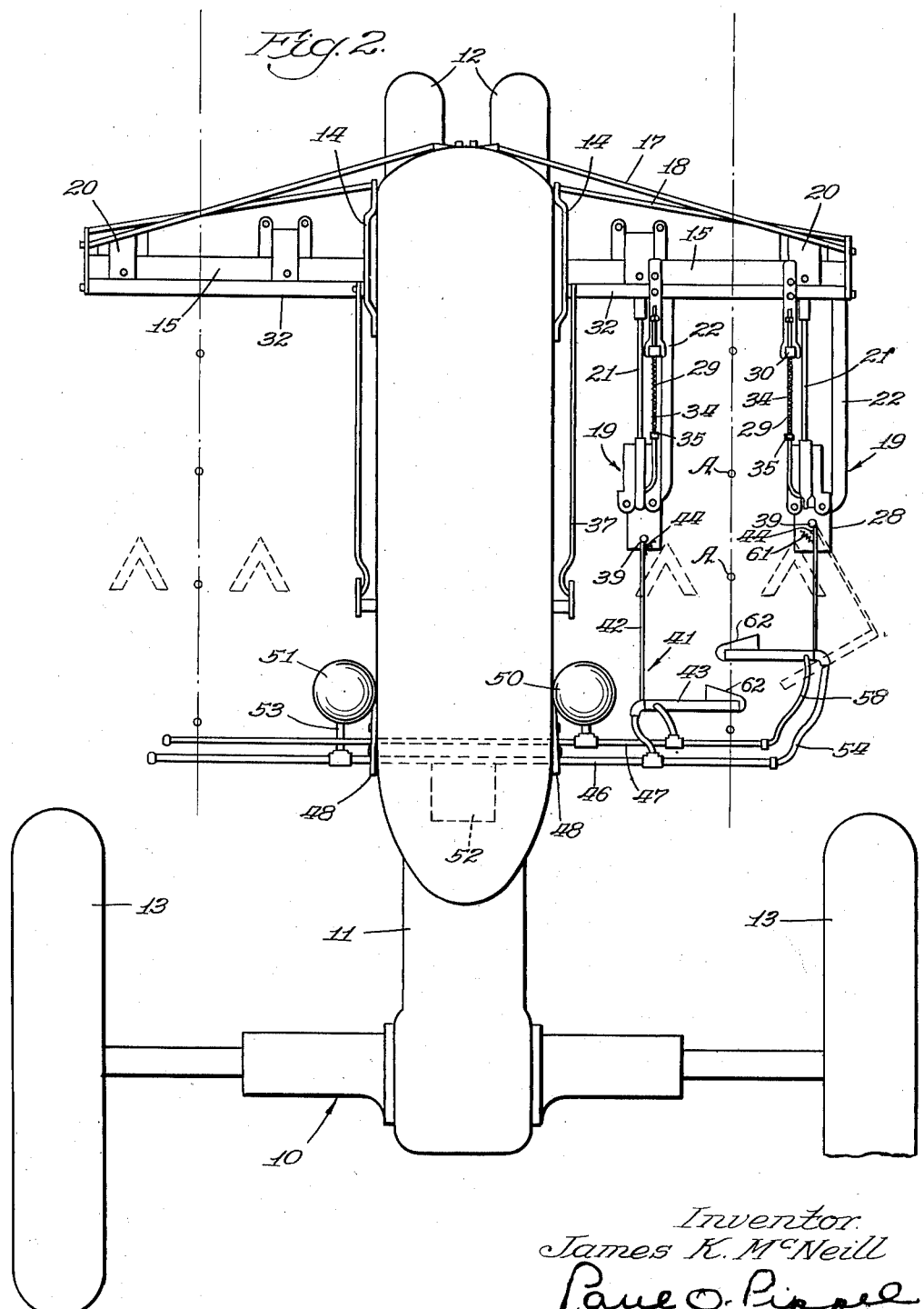

March 4, 1952     J. K. McNEILL     2,587,873
APPARATUS FOR CULTIVATION BY FLAME
Filed Dec. 26, 1947     3 Sheets-Sheet 3

Inventor.
James K. McNeill
Paul O. Pippel
Atty.

Patented Mar. 4, 1952

2,587,873

UNITED STATES PATENT OFFICE 2,587,873

APPARATUS FOR CULTIVATION BY FLAME

James K. McNeill, Gary, Ind., assignor to International Harvester Company, a corporation of New Jersey Application December 26, 1947, Serial No. 793,964

9 Claims. (Cl. 47—1)

This invention relates to agricultural implements and particularly to an apparatus for the cultivation of plants. More specifically, the invention concerns mechanism and means for destroying weeds and the like which tend to interfere with and retard the growth of selected vegetation. This application has been divided, and a new application Serial No. 117,112 filed on September 22, 1949.

An object of the invention is to provide novel means for the cultivation of growing crops.

Another object of the invention is to provide means for the destruction by flame of weeds and like vegetation in the vicinity of growing crop plants.

The invention will be described in its application to the cultivation of row crop plants by mechanism carried upon a vehicle having a power plant for propelling the vehicle and the cultivating mechanism over a planted field in a direction parallel to the plant row.

A further object of the invention is the provision of means for the destruction of undesirable vegetation in a crop row substantially without injury to the crop plants.

The apparatus described herein is more readily adaptable to the cultivation of plants which develop a large stem and a root system which firmly holds the plant to the soil. At a selected stage of growth such a plant is more resistant to the application of a flame than are the weaker weeds and other vegetation growing in and around the crop plant. Likewise, such a plant is sturdy enough to offer considerable resistance to a force that would readily bend weaker and more pliable vegetation. Therefore, another object of the invention is the provision of a flame burner pivotally mounted at one end upon the vehicle and having the end carrying the burner head extending across the plant row in the path of the vegetation and of the crop plants while the vehicle is being propelled across the field, wherein resilience is imparted to the mounting of the burner member upon the vehicle to cause the implement to be deflected upon contact with the stem of the crop plant.

Another object of the invention is the provision of means for supplying a combustible fluid from a source on the vehicle to the burner head and to shield the burner head substantially against contact with the crop plant.

A further object of the invention is to provide in a flame cultivator mechanism adapted to direct vertically dowardly a flame or group of flames extending across the plant row in the path of the crop plants and near enough to the ground and the weed growth in the crop row that a short flame of low intensity may be adequate for the destruction of the undesired vegetation.

Other objects and advantages of the invention will become clear after a consideration of the following detailed description in conjunction with the accompanying drawings.

Figure 2 is a plan view of the structure shown in Figure 1.

Figure 1:
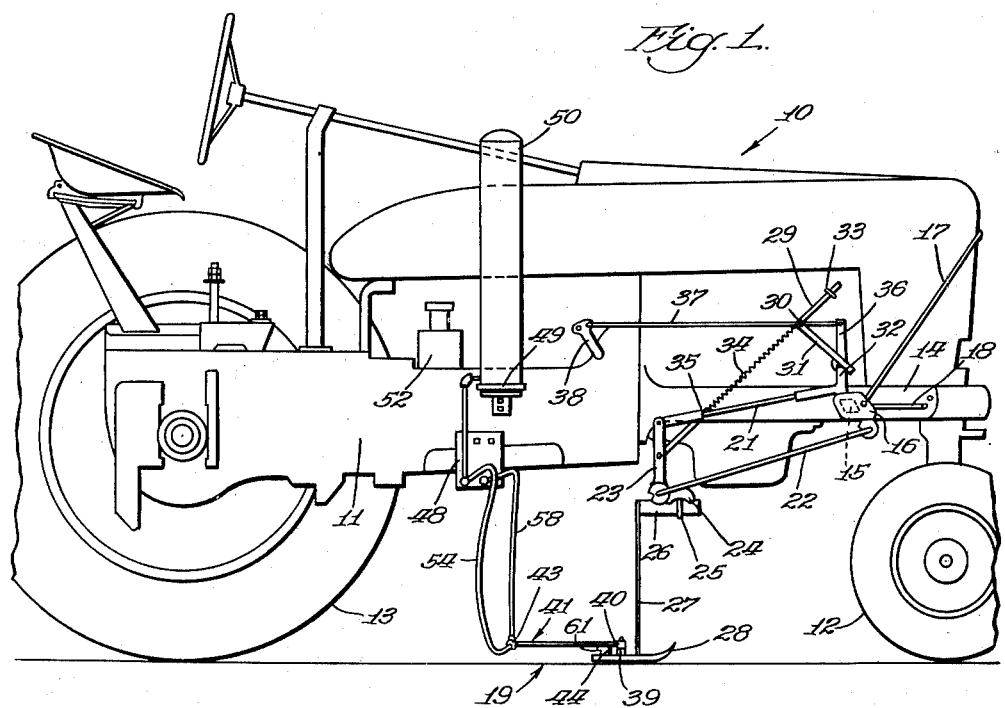
Figure 1 is a view in side elevation of a tractor with one rear wheel removed and showing mounted thereupon an apparatus embodying the features of the present invention.

Referring to the drawings, it will be observed that the numeral 10 designates a conventional tractor having a longitudinally extending body 11 incorporating a conventional tractor power plant. The tractor is the straddle row tricycle type having front wheels 12 and laterally spaced rear drive wheels 13.

Secured to the sides of the tractor body at the forward end thereof are plates 14, each of which has affixed thereto the inner end of a laterally extending tool bar 15. Each tool bar 15 is provided at its end with a plate 16 which serves to anchor the outer ends of brace rods 17 and 18. The other end of rod 17 is connected to the front of the tractor and the other end of rod 18 is connected to the plate 14. Each of the tool bars 15 serves for the attachment thereto of cultivating units 19. The tool bar at only one side of the tractor is shown as so equipped and only the cultivating mechanism on that side of the tractor will be described since it may be understood that the equipment on the other side of the tractor is merely a duplicate thereof.

Secured to the tool bar 15 at laterally spaced locations thereon are brackets 20. Each bracket 20 has pivotally connected thereto at vertically spaced locations the forward ends of upper and lower generally parallel links 21 and 22. The rear ends of these links are connected by a standard 23 provided with a right angled base portion 24 carrying an eye-bolt 25. Eye-bolt 25 serves for the attachment of a drag bar 26 having affixed thereto a vertically extending hanger 27 to the lower end of which is secured a ground contacting gauge shoe 28.

The implement shown in the drawings is a two row cultivator and one of the rows is shown in Figure 2 as straddled by the cultivating units 19, one on each side of the row. Thus gauge shoes 28 are adapted to contact the ground and to be propelled thereover by the tractor at opposite sides of the plant row.

At this point it should be clear than gauge shoe 28 is capable of vertical floating movement with respect to the tractor to follow the contour of the ground by virtue of the pivotal mounting of parallel links 21 and 22 upon which the gauge shoe is supported. The parallel links 21 and 22 and the gauge shoe 28 are resiliently urged downwardly into contact with the ground by mechanism including a rod 29, the lower end of which is pivotally connected to the standard 23 and the other end of which is slidably received in a swivel 30 carried at the end of an arm 31 mounted upon a bail 32. Bail 32 has a transverse portion parallel to the tool bar 15 and depending end portions by which the outer end of the bail is pivotally connected to the plate 16 and the inner end thereof to the plate 14.

At the upper end of rod 29 is adjustably secured a collar 33 and a spring 34 surrounds the rod between the swivel 30 and a collar 35. Each of the units 19 is individually mounted upon the tool bar 15 and is independently vertically movable with respect to each other and to the tractor. By rocking the bail 32 in a clockwise direction as viewed in Figure 1, the cultivator units 19 may be raised to an inoperative or transport position upon the tractor. This swinging of the bail is accomplished by mechanism including an arm 36 secured to the inner end of the bail 32 and pivotally connected by a rod 37 with a rock arm 38 carried by the tractor body and rocked under the control of the tractor operator by lifting mechanism deriving power from the tractor power plant.

Secured to the gauge shoe 28 and extending upwardly therefrom is a pin 39 upon which is journaled a bearing 40 to which is secured a member 41 comprising a rearwardly extending strap 42, the forward end of which is secured to the bearing 40 and the rear end of which has secured thereto and extending laterally therefrom at right angles an elongated burner head 43. As will be clear from Figure 1, burner head 43 extends laterally across the plant row and in opposite directions from each of the units 19. Bearing 40 is preferably of the ball type and at this point it should be clear that each member 41 is capable of pivoting laterally about its connection with the pin 39. To limit the swinging of the member 41 toward the plant row a stop is provided comprising a peg 44 extending upwardly from the shoe 28 and arranged to engage the inner face of the strap 42 when the member 41 is in the position indicated in solid lines, for example in Figure 2.

Figure 4:
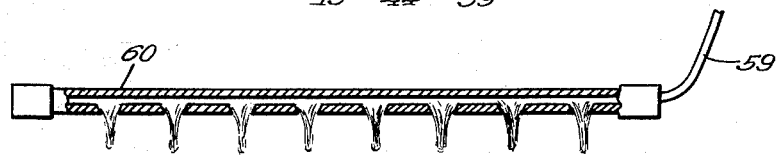
Figure 4 is a detail of a burner head.

Each of the burner heads 43 is provided with a flammable or combustible fluid to form a flame by mechanism hereinafter described and is adapted to direct vertically downwardly a relatively low flame extending across the plant row into the path of the crop plants indicated at "A" in Figure 2. A number of types of fuel for providing a flame at the burner openings may be utilized. A gas such as butane requiring no compression or atomization is preferred where a simple burner head such as is shown in Figure 4 is utilized, although heavier hydro-carbon oils may be used with conventional compression equipment such as is indicated in the drawings. No detailed description of such equipment is indicated. It may be noted, however, that a pair of manifold pipes 46 and 47 are provided and secured to plates 48 mounted upon opposite sides of the tractor between the front and rear wheels thereof. Likewise mounted upon the tractor body at opposite sides thereof are brackets 49, one of which is shown in Figure 1. The brackets 49 serve to support vertically extending tanks 50 and 51. Where it is desired to use a relatively heavy oil for supply to the burner heads 43, tank 50 may be filled with oil, while tank 51 may be filled with air under pressure from a compressor 52 mounted upon the tractor and deriving power therefrom and suitably connected to the storage tanks in a manner not shown.

Figure 5:
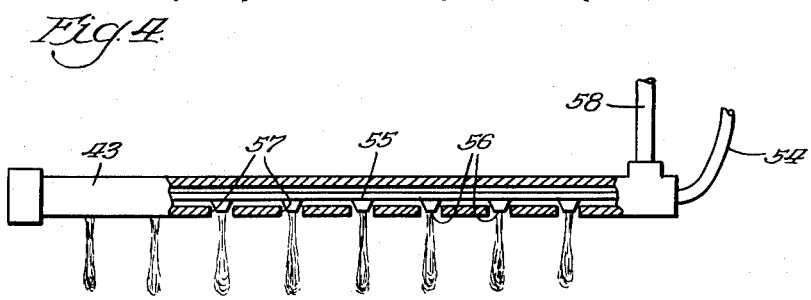
Figure 5 is a detail of another form of burner head which may be utilized according to the principles of this invention.
Figure 3:
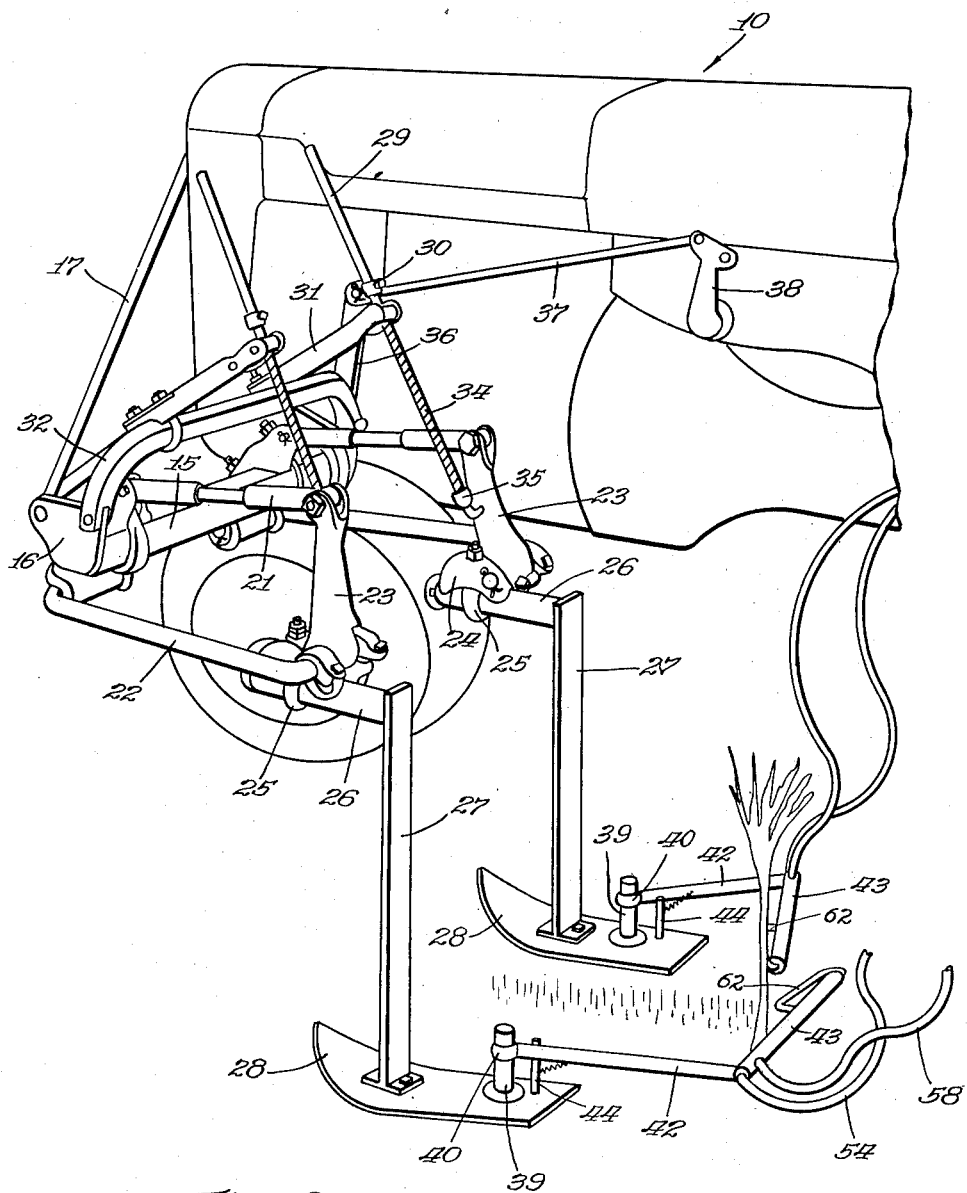
Figure 3 is a perspective view of the forward end of a tractor showing the implement connected thereto.

Air tank 51 is connected by a pipe 53 with the manifold pipe 46 and connected to this pipe is a flexible conduit 54, the other end of which is connected to the burner head 43. Where air under pressure is supplied for the purpose of atomizing the fluid the burner head 43 is provided with a tube 55 which extends the length of the interior thereof and communicates with the conduit 54 through which air under pressure is supplied. Pipe 55 is provided with a plurality of jet openings 56 along the lower surface thereof and each opening registers with the adjacent opening 57 in the burner head 43 as indicated in Figure 5. Fuel is supplied to the burner head 43 to be expressed through the openings 57 by way of a conduit 58 which is flexible and connects with the manifold pipe 47. Similar connections are made from the manifold pipe 46 and 47 to the other cultivating units 19 for the supply of fluid and air thereto. It has been previously noted that a gaseous fluid such as butane is preferred where a simple burner is utilized and may be supplied to the burner head through a conduit 59 as indicated in Figure 4, wherein the burner head is designated by the numeral 60.

The burner head 43 or 60 preferably travels relatively close to the surface of the ground and the weeds in the crop row so that a relatively short flame is sufficient for the destruction of the undesired vegetation. Upon advance of the tractor across the planted field parallel to the plant rows, the burners will come in contact successively with the plants "A" in the row. Inasmuch as the flame is directed vertically downwardly substantially no contact of the flame is made with the crop plant per se. Upon contact of the burner head with a crop plant, the member 41 pivots about its connection to the pin 39 to the dotted line position indicated in Figure 2. The member 42 is urged to return to its operating position against the stop 44 by a spring 61 connected between the strap 42 and the shoe 28. A shield 62 of wire or other suitable material is preferably provided and attached to the burner head to prevent direct contact of the latter with the crop plant.

The invention has been described in its preferred embodiment. However, it should be understood that modifications may be made therein without departing from the spirit thereof. Therefore, it is desired that the invention be limited only by the scope of the appended claims.

What is claimed is:

1. In a machine for destroying undesirable vegetation in a crop row between and around growing stemmed row crop plants, a vehicle adapted to travel between the crop rows and parallel thereto, a supporting member carried by the vehicle and pivoted at one end for swinging movement about a vertical axis, said member having at its outer end a burner head, said burner head being elongated and extending laterally across the plant row generally parallel to the ground, openings formed in the lower face of said burner head adapted to direct a flame generally vertically downwardly, and means for supplying a flammable fluid to said burner head.

2. In a machine for destroying undesirable vegetation in a crop row between and around growing stemmed row crop plants, a vehicle adapted to travel between the crop rows and parallel thereto, a supporting member carried by the vehicle and pivoted at one end for swinging movement about a vertical axis, said member having at its outer end a burner head, said burner head being elongated and extending laterally across the plant row generally parallel to the ground in the path of the plants during the progress of the vehicle, openings formed in the lower face of said burner head adapted to direct generally vertically downwardly a flame extending to opposite sides of the plants, said member being swingable rearwardly and laterally upon contacting a plant, and means for supplying a flammable fluid to said burner head.

3. In a machine for destroying undesirable vegetation in a crop row between and around growing stemmed row crop plants, a vehicle adapted to travel between the crop rows and parallel thereto, a supporting member carried by the vehicle and pivoted at one end for swinging movement about a vertical axis, said member having at its outer end a burner head, said burner head being elongated and extending laterally across the plant row generally parallel to the ground in the path of the plants during the progress of the vehicle, openings formed in the lower face of said burner head adapted to direct generally vertically downwardly a flame extending to opposite sides of the plants, said member being swingable rearwardly and laterally upon contacting a plant, means for supplying a flammable fluid to said burner head, and resilient means yieldably resisting swinging of the member about its pivot.

4. In a machine for destroying undesirable vegetation in a crop row between and around growing stemmed row crop plants, a vehicle adapted to travel between the crop rows and parallel thereto, a supporting member carried by the vehicle and pivoted at one end for swinging movement about a vertical axis, said member having at its outer end a burner head, said burner head being elongated and extending laterally across the plant row generally parallel to the ground in the path of the plants during the progress of the vehicle, openings formed in the lower face of said burner head adapted to direct generally vertically downwardly a flame extending to opposite sides of the plants, said member being swingable rearwardly and laterally upon contacting a plant, and means for supplying a flammable fluid to said burner head, and resilient means yieldably resisting swinging of the member about its pivot, and a shield mounted upon said burner head engageable with the crop plants to prevent contact of the burner head therewith.

5. In a machine for destroying weeds and the like in a crop row between and around growing stemmed row crop plants, wherein the weeds are more flexible than the crop plants, a vehicle adapted to be propelled between the crop rows parallel thereto, a supporting member carried by the vehicle having a burner head extending laterally from the vehicle across the plant row in a position to engage the vegetation therein upon forward movement of the vehicle, said burner being adapted to project generally vertically downwardly a flame extending across the plant row generally parallel to the ground, means flexibly mounting said member for horizontal movement with respect to the vehicle, said mounting means being sufficiently rigid to overcome the resistance of the weeds in the row but sufficiently flexible to accommodate yielding of the member upon contacting the weed with the stem of the crop plant, and means for supplying a flammable fluid to said burner head.

6. In a machine for destroying weeds and the like in a crop row between and around growing stemmed row crop plants, wherein the weeds are more flexible than the crop plants, a vehicle adapted to be propelled between the crop rows parallel thereto, a supporting member carried by the vehicle having a burner head extending laterally from the vehicle across the plant row in a position to engage the vegetation therein upon forward movement of the vehicle, said burner being adapted to project generally vertically downwardly a flame extending across the plant row generally parallel to the ground, means flexibly mounting said member for horizontal movement with respect to the vehicle, said mounting means being sufficiently rigid to overcome the resistance of the weeds in the row but sufficiently flexible to accommodate yielding of the member upon contacting the weed with the stem of the crop plant, means for supplying a flammable fluid to said burner head, and a shield mounted upon the burner head engageable with the crop plant to prevent contact of the burner with the plant.

7. In a machine for destroying weeds and the like in a crop row between and around growing stemmed row crop plants, wherein the weeds are more flexible than the crop plants, a vehicle adapted to be propelled between the crop rows parallel thereto, a supporting member carried by the vehicle having a burner head extending laterally from the vehicle across the plant row in a position to engage the vegetation therein upon forward movement of the vehicle, said burner being adapted to project generally vertically downwardly a flame extending across the plant row generally parallel to the ground, means flexibly mounting said member for horizontal movement with respect to the vehicle, said mounting means being sufficiently rigid to overcome the resistance of the weeds in the row but sufficiently flexible to accommodate yielding of the member upon contacting the weed with the stem of the crop plant, means for supplying a flammable fluid to said burner head, a shield mounted upon the burner head engageable with the crop plant to prevent contact of the burner with the plant, and gauge means for maintaining the burner head at a substantially uniform height above the ground.

8. In a machine for destroying weeds and the like in a crop row between and around growing stemmed row crop plants, a vehicle adapted to be propelled parallel to the crop row, a ground engaging gauge member mounted upon the vehicle for vertical floating movement with respect thereto in response to changes in ground contour, a burner head pivotally mounted upon the gauge member and extending laterally therefrom across the plant row in a position to engage the vegetation therein upon forward travel of the vehicle, said burner being adapted to project generally vertically downwardly a flame extending across the plant row generally parallel to the ground and being adapted to yield upon engagement thereof with the stem of the crop plant, power lift means on the vehicle deriving power therefrom, and a connection between said power lift means and said gauge member for moving the latter between operating and transport positions.

9. In a machine for destroying weeds and the like in a crop row between and around growing stemmed row crop plants, a vehicle adapted to be propelled parallel to the crop row, a ground engaging gauge member mounted upon the vehicle for vertical floating movement with respect thereto in response to changes in ground contour, a burner head pivotally mounted upon the gauge member and extending laterally therefrom across the plant row in a position to engage the vegetation therein upon forward travel of the vehicle, said burner being adapted to project generally vertically downwardly a flame extending across the plant row generally parallel to the ground and being adapted to yield upon engagement thereof with the stem of the crop plant, power lift means on the vehicle deriving power therefrom, a connection between said power lift means and said gauge member for moving the latter between operating and transport positions, and yieldable means resisting pivoting of the burner head.

JAMES K. McNEILL.

REFERENCES CITED

The following references are of record in the file of this patent:

UNITED STATES PATENTS

| Number | Name | Date |
|---|---|---|
| Re. 22,803 | McLemore | Oct. 15, 1946 |
| 1,419,900 | Franks | June 13, 1922 |
| 1,436,958 | Hebert | Nov. 28, 1922 |
| 1,754,083 | Collins | Apr. 8, 1930 |
| 1,956,697 | Rognerud | May 1, 1934 |
| 2,012,521 | Rognerud | Aug. 27, 1935 |
| 2,327,204 | McLemore | Aug. 17, 1943 |
| 2,408,328 | McLemore | Sept. 24, 1946 |
| 2,494,720 | Richards | Jan. 17, 1950 |